April 15, 1958    C. B. ROBINSON ET AL    2,830,545
CASTOR CONSTRUCTION
Filed Jan. 21, 1954     3 Sheets-Sheet 1
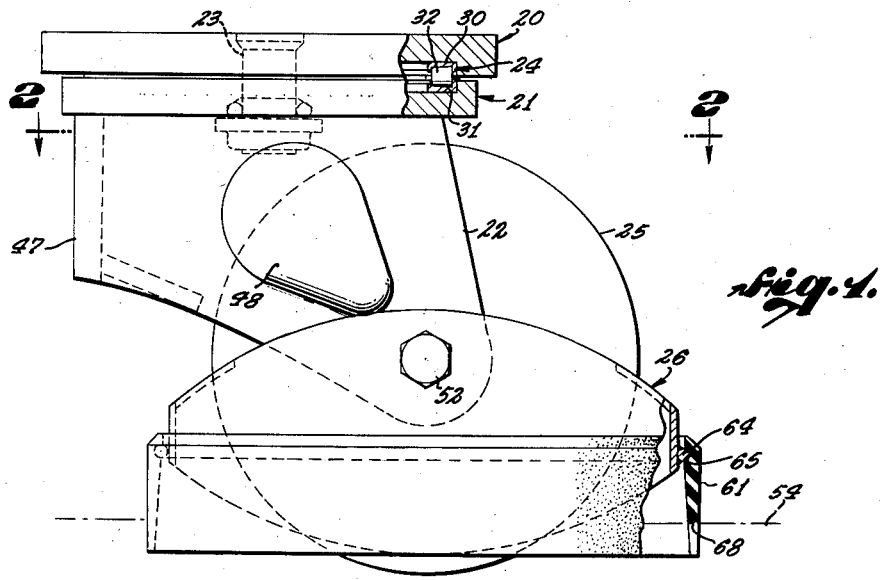
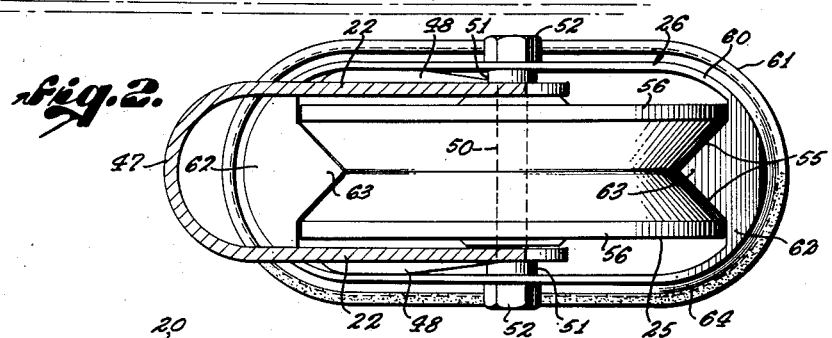
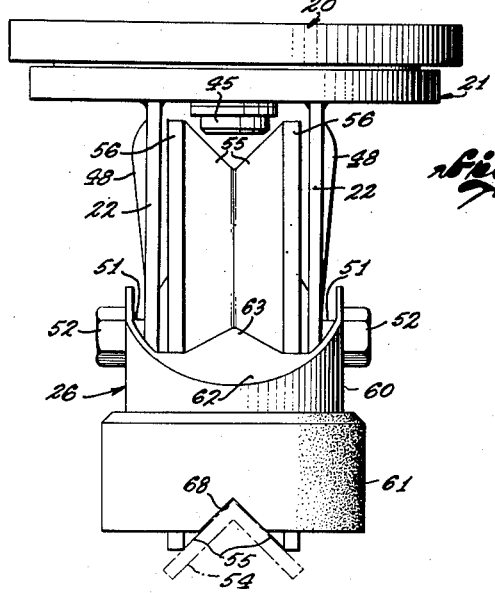
CARL B. ROBINSON,
WILLIAM F. HERTZOG &
CLARENCE F. LANDMEYER,
INVENTORS.
BY
ATTORNEY.

April 15, 1958   C. B. ROBINSON ET AL   2,830,545
CASTOR CONSTRUCTION
Filed Jan. 21, 1954   3 Sheets-Sheet 2

CARL B. ROBINSON,
WILLIAM F. HERTZOG &
CLARENCE F. LANDMEYER,
INVENTORS.

BY

ATTORNEY.

April 15, 1958 — C. B. ROBINSON ET AL — 2,830,545
CASTOR CONSTRUCTION
Filed Jan. 21, 1954 — 3 Sheets-Sheet 3
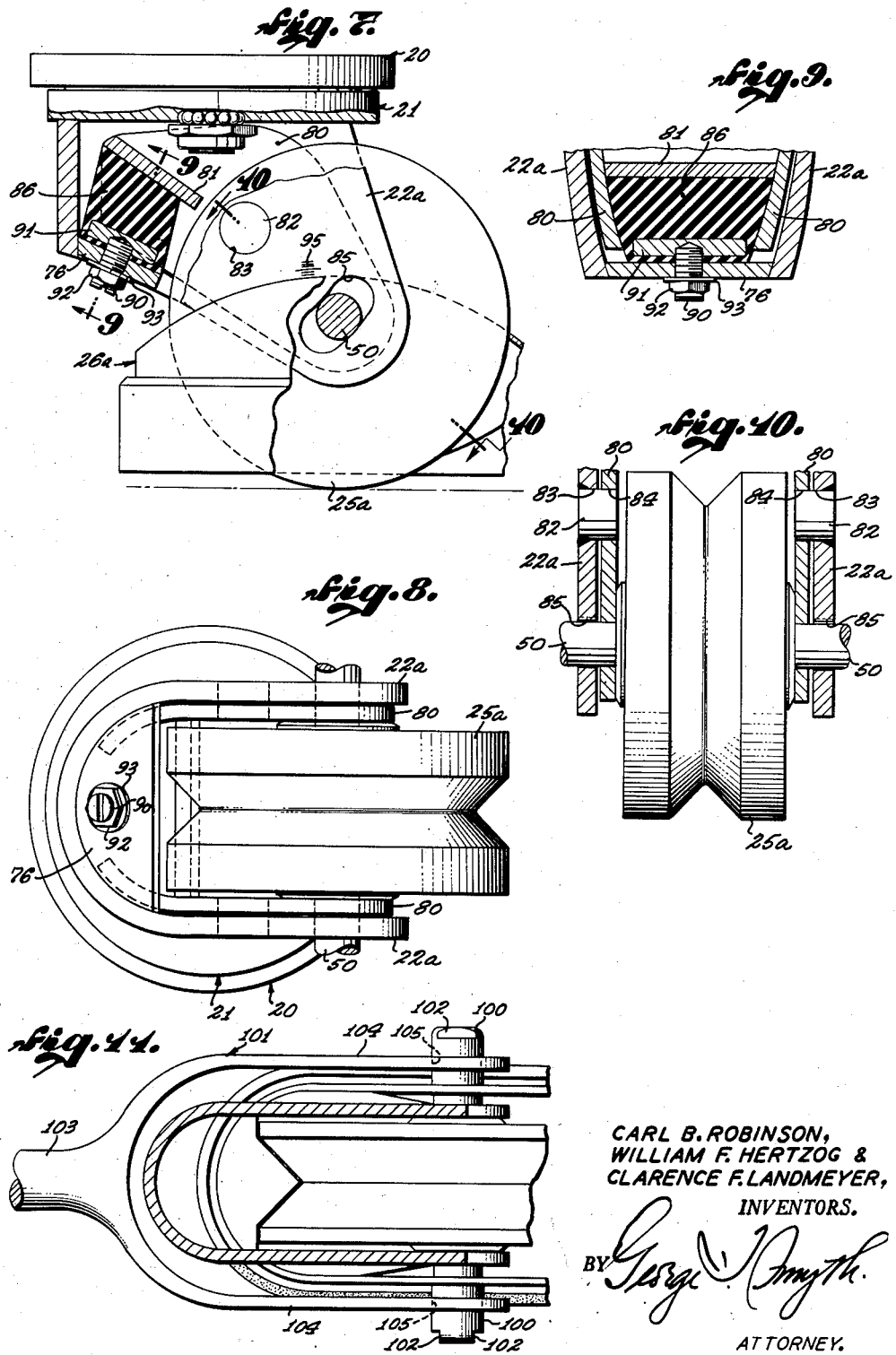
CARL B. ROBINSON,
WILLIAM F. HERTZOG &
CLARENCE F. LANDMEYER,
INVENTORS.
BY George V. Smyth
ATTORNEY.

United States Patent Office 2,830,545
Patented Apr. 15, 1958

2,830,545

CASTOR CONSTRUCTION

Carl B. Robinson, Redondo Beach, William F. Hertzog, Torrance, and Clarence F. Landmeyer, Los Angeles, Calif., assignors, by direct and mesne assignments, to Aircraft Tool Engineering Co., Los Angeles, Calif.

Application January 21, 1954, Serial No. 405,491

25 Claims. (Cl. 105—170)

This invention relates to a heavy duty castor construction for use on a vehicle that is to carry a load measurable in tons. While the invention has many applications for its general purpose, it has special utility in its initial embodiment in a conveyor vehicle for use on the assembly line in an aircraft plant. Such a vehicle is used not only to transport its load on the rails of a track along an assembly line, but is also used to convey its load on flat floor surfaces and a crane is used to lift the loaded vehicle onto and off of the assembly track and in some instances to carry the loaded vehicle from one point to another. The vehicle is also moved by man power and the castors swivel to permit free movement in all directions and to permit the vehicle to rotate in the manner of a turntable when required.

It is a primary requisite, of course, that such a castor be of sufficient inherent strength and ruggedness to stand up in this kind of service. One problem is to provide a construction that will withstand shock loads on the castors that occur when the vehicle is lowered to a position of rest by the crane. Another problem is to withstand shock forces that occur when a castor wheel encounters an obstacle such as a small object or an irregularity in the surface over which the castor wheel rolls.

Both of these problems are made difficult by the fact that the wheel axis must be displaced laterally at a substantial radial distance from the vertical swivel axis to make the swivel action sufficiently sensitive to lateral forces. This offset of the castor wheel axis from the vertical swivel axis makes the usual castor wheel construction highly vulnerable to both vertical and lateral shock loads.

One feature of the invention in this regard is the use of an antifriction swivel bearing having a circle of load-transmitting rotary elements with the radius of the circle large enough to include the radial distance of the wheel axis from the swivel axis. Thus, all static load forces and impact reaction forces involving the castor wheel occur within the circumference of the swivel bearing with obvious advantages. A further feature in this respect is the use of a castor wheel of relatively large diameter, preferably at least of the same order of magnitude as the diameter of the swivel bearing. Along with this feature is a structural arrangement that minimizes the vertical distance of the wheel below the swivel bearing and thus minimizes the length of the moment arm created by a lateral shock force against the wheel.

It has been found advisable to use a kingpin in cooperation with the anti-friction swivel bearing to withstand lateral forces so that the anti-friction swivel bearing is required only to withstand vertical forces. A further problem arises here in that such a kingpin of conventional construction proves to be highly vulnerable to breakage. The invention meets this latter problem by two provisions. First, it employs a kingpin that is fixedly secured only at its upper base end and has a major downwardly extending portion that is free from the surrounding structure and is provided with a smooth surface without any breaks in the surface configuration to favor fracturing. Second, the invention provides a second smaller anti-friction bearing between the kingpin and the surrounding swivel structure with provision for periodically tightening this second bearing to compensate for wear.

With further reference to the problem of withstanding shock forces, the invention is characterized by a built-in shock absorber. For this purpose, the castor construction includes the usual downwardly extending wings or horns for the castor wheel, but the wheel itself is carried by a second pair of wings or horns that is pivotally connected to the first pair. The second pair rotate in response to shock loads, but such rotation is opposed by a suitable yielding means acting under compression. In the preferred practice of the invention, the yielding means is in the form of a confined resilient body of rubber-like material and means is provided for adjusting the rotary position of the wheel-bearing wings at any given loading of the resilient body.

A special advantage of such adjustability is that it permits a highly desirable equalization adjustment among the various castors of the vehicle. In nearly all instances the vehicle load is distributed unevenly among the castors with the result that some castors tend to yield vertically more than the others. This tendency may be counteracted by manipulating the adjustment means of each of the individual castors to place all of the castor wheels at substantially the same spacing below the vehicle frame. It has been found in practice that this kind of vertical equalization of the cushioned wheels is especially important to avoid damage by the vertical shocks involved in the lowering of the vehicle by a crane to a position of rest.

Another problem is to minimize the hazards involved in the use of a heavily loaded conveyor vehicle of this kind for factory production. Usually a number of assembly craftsmen are active around the vehicle and special safeguards are desirable to prevent the castor wheels from causing foot and hand injuries. The wheels may swivel unexpectedly towards a worker's foot during the maneuvering of the vehicle and the mass of the vehicle together with its load is so great that any movement of the vehicle, no matter how small, involves momentum of too great magnitude to be instantly absorbed by manual resistance.

This safety problem is met by a guard that surrounds the lower portion of the castor wheel and swivels with the wheel. One feature in this regard is a guard construction which includes a replaceable skirt of yielding rubber-like material. The yielding character of the skirt makes it possible to place the lower edge of the guard close to the floor. Another feature is the use of such a guard that is recessed to clear a track so that the guard is effective both on a track and on the floor, and when used on the floor, moves in close spacing to the floor surface. A still further feature is that the guard is adapted to remove clinging objects from the periphery of the wheel. For this purpose, a portion of the guard extends close to the periphery of the wheel and is sloped away from the wheel to deflect dislodged objects away from the wheel. Preferably the yielding skirt extends close to the rail of a track when the wheel is on a track, as well as close to the floor, and thus serves as means to displace objects away from the path of the wheel.

The various features and advantages of the invention will be apparent in the following detailed description considered with the accompanying drawings.

In the drawings, which are to be regarded as merely illustrative:

Figure 1 is a side elevation of one embodiment of the invention with minor portions broken away to reveal concealed structure;

Figure 2 is a transverse section taken as indicated by the line 2—2 of Figure 1;

Figure 3 is a front elevation of this first embodiment of the invention;

Figure 7 is a side elevation of a second embodiment of the invention with parts broken away to reveal concealed structure;

Figure 8 is a bottom view of the structure shown in Figure 7 with the guard removed;

Figure 9 is an enlarged section taken as indicated by the line 9—9 of Figure 7;

Figure 10 is a section taken as indicated by the line 10—10 of Figure 7; and

Figure 11 is a view similar to Figure 2 showing a modification of the first embodiment of the invention for use with a steering yoke.

Figure 4:
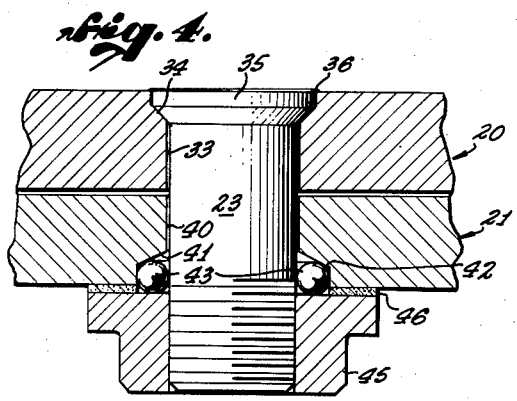
Figure 4 is an enlarged fragmentary vertical section showing the kingpin and associated structure.

The principal parts of the first embodiment of the invention shown in Figures 1 to 6 include: an upper base member 20; a swivel member 21 mounted rotatably on the under side of the base member; a pair of wings 22 extending rigidly downward from the swivel member; a kingpin 23 extending downward from the base member for cooperation with the swivel member; an antifriction bearing 24 of relatively large diameter concentric with the kingpin 23 to transmit load forces between the base member and the swivel member; a support wheel 25 carried by the two wings 22 of the swivel member; and a guard 26 enclosing the lower portion of the support wheel.

The under face of the upper base member 20 is recessed as shown in Figure 1 to seat the upper race 30 of the antifriction bearing 24 and in like manner the upper face of the swivel member 21 is recessed to seat the lower race 31 of the bearing. The anti-friction rotary elements of the bearing are shown in the form of a circular series of tapered rollers 32.

The upper base member 20 is provided with the usual holes (not shown) to receive bolts or rivets for attachment to the underside of vehicle frame (not shown) and preferably the upper base member 20 is provided with a central circular aperture 33 for the kingpin 23. As best shown in Figure 4, preferably the circular aperture 33 is enlarged to provide a conical shoulder 34 near its upper end and the kingpin is formed with an enlarged base portion 35 at its upper end of similar configuration to seat on the conical shoulder 34. A feature of the present construction is that the kingpin is attached to the base member 20 solely by welding 36 restricted to the upper end of the pin at the upper surface of the base member 20.

The kingpin 23 extends through a central circular aperture 40 in the swivel member 21 and preferably this aperture is enlarged at its lower end to form a downwardly presented conical shoulder 41 and a cylindrical wall 42 of enlarged diameter extending downward from the shoulder. Thus, the conical shoulder 41 and the cylindrical wall 42 define with the kingpin 23 an annular space around the kingpin to serve as a race for a series of balls 43. The balls 43 are suitably confined from below to cooperate with the conical shoulder 41 and with the periphery of the kingpin 23 to keep the swivel member 21 centered on the kingpin. Thus, the balls 43 provide a second antifriction swivel bearing in addition to the first mentioned large diameter anti-friction swivel bearing 24.

Any suitable means may be adjustably mounted on the lower end of the kingpin 23 to confine the balls 43 and, in addition, to prevent separation of the swivel member 21 from the upper base member 20. In the construction shown, the balls 43 extend below the plane of the bottom face of the swivel member 21 and are engaged by a suitable nut member 45 that is threaded onto the lower end of the kingpin 23. It is apparent that the nut member 45 may be tightened whenever necessary to eliminate any looseness in this second bearing arising from wear on the surface of the kingpin, the surface of the swivel member and the surface of the nut member. Preferably the space between the upper face of the nut member 45 and the lower face of the swivel member 21 is sealed by a suitable ring 46, the sealing ring 46 being made of rubberlike material to yield and thus avoid interfering with wear-compensating tightening of the nut member 45.

It is contemplated that both the circular aperture 33 of the base member 20 and the circular aperture 40 of the swivel member 21 will be slightly larger than the outside diameter of the kingpin 23 to avoid confining contact with the kingpin. Thus, the major portion of the kingpin below its enlarged base portion 35 is free from the surrounding structure. It is further contemplated that this major portion of the kingpin extending downward from the enlarged base portion 35 will have a smooth surface, preferably a polished surface, so that the kingpin is free from any weak point in this region where a fracture might start in response to lateral stressing of the kingpin.

Preferably, the two wings 22 are formed by a single heavy plate welded onto the underside of the swivel member 21, the plate being U-shaped in plan as shown in Figure 2, so that the two wings 22 are interconnected by a curved web 47. In the construction shown each of the two wings 22 is formed with a stiffening dimple 48. The support wheel 25 is mounted between the two wings 22 on a suitable axle 50 which axle also preferably carries the guard 26. As shown in Figure 2, suitable spaced collars 51 are mounted on the axle 50 between the two wings 22 and the guard 26 and suitable nuts 52 are mounted on the ends of the axle in abutment against the two outer sides of the guard.

It is to be noted in Figure 1 that the wheel axle 50 is positioned inside the circumference of the anti-friction bearing 24 in the sense that the radial distance of the wheel axle from the vertical axis of the kingpin 23 is less than the radial dimension of the anti-friction bearing 24. It is also to be noted that the diameter of the support wheel 25, as shown in Figure 1, is at least of the same order of magnitude as the diameter of the anti-friction bearing 24. Thus, the invention is characterized by a support wheel that is relatively large in diameter, but nevertheless lies directly under and within the circumference of the anti-friction bearing about which the support wheel swivels. It is also to be noted that since the wheel 25 is laterally offset from the kingpin 23, the wheel may be positioned relatively close to the bottom face of the swivel member 21. The wheel actually extends above the lower end of the kingpin. The advantage of this close vertical spacing of the support wheel relative to the swivel member 21 is that it minimizes the moment arm measured downward from the swivel member that is created by impact of the support wheel against an obstacle.

In the present practice of the invention, it is contemplated that the support wheel 25 will be adapted to ride along a V-shaped rail 54 comprising a piece of angle iron positioned with its apex uppermost. Accordingly, the support wheel 25 is formed with a pair of diverging flanges 55 for contact with the two diverging faces of the rail, each of the wheel flanges 55 having a narrow cylindrical portion 56 for contact with the floor or ground when the wheel is off of the rail.

The guard 26 which encloses the lower portion of the support wheel 25 preferably comprises a hood member 60 of relatively rigid material and a skirt 61 of resilient material extending downward from the hood member. The hood member 60, which may be fabricated from heavy sheet metal, is an upright shell that is apertured on its opposite sides for mounting on the axle 50 and is elongated in plan to surround the support wheel 25. Welded to the shell is a top wall comprising two spaced wall members 62 at the opposite ends respectively of the shell, each of the wall members 62 being formed with a tongue 63 that extends inward between the two flanges 55 of the wheel and conforms to the peripheral configuration of the wheel. The two tongues 63 extend relatively close to the wheel surface to dislodge anything that may cling to the wheel or may tend to drop onto the path immediately in front of the wheel. As best shown in Figure 1, the two tongues are preferably inclined so that any objects thereon will tend to be deflected away from the wheel.

The skirt 61 is preferably in the form of a continuous band of rubber-like material and is preferably mounted by elastically embracing the hood member 60. As best shown in Figure 1, the hood member 60 may be provided with a peripheral rib or bead 64 in the form of a rod or heavy wire welded to its peripheral surface and the skirt 61 may be formed with a complementary inner groove 65 for engagement with the rib. It is apparent that the rib 64 provides an upwardly facing shoulder and the inner groove 65 provides a downwardly facing shoulder in engagement therewith for holding the skirt in the desired horizontal position on the hood member. It is contemplated that the skirt will elastically embrace the rib 64 in tension and may be peeled off of the hood member when desired.

At the front end of the skirt 61 and again at the rear end, is a suitably V-shaped recess 68 in the bottom edge of the hood to clear the V-shaped rail 54. Thus, the skirt serves as a guard to push away any objects on the rail that may lie in the path of the advancing wheel. As may be seen in Figures 1 and 3, the bottom edge of the skirt extends below the minor diameter of the wheel, i. e. the diameter at the midpart of the wheel between the two flanges 55, but nevertheless lies within the major diameter of the wheel, i. e., the diameter of the cylindrical portions 56 of the flanges. Thus, the bottom edge of the skirt is adapted to sweep away objects in its path on the top of the rail 54, and yet clears the floor when the wheel rests on the floor away from the rail.

Figure 5:
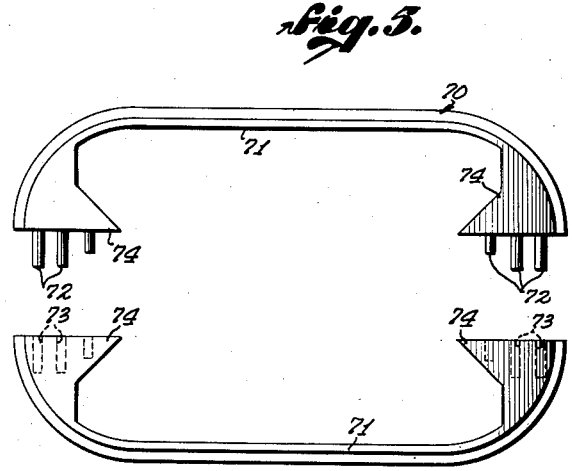
Figure 5 is a plan view showing how a rigid portion of the wheel guard may be made in two sections.
Figure 6:
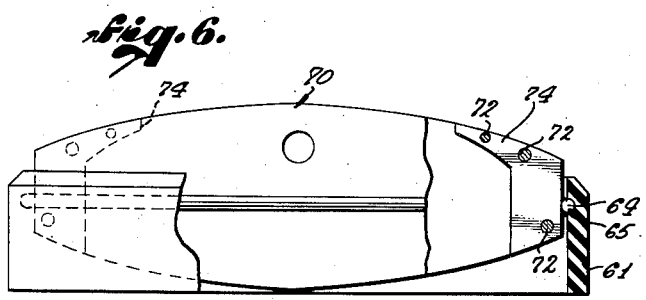
Figure 6 is a view of the guard construction of Figure 5, partly in section and partly in side elevation.

The purpose of Figures 5 and 6 is to illustrate how a two-piece hood member comprising a pair of castings may be substituted for the previously described sheet metal hood member 60. The hood member 70 is made in two sections 71 which have a central longitudinal parting line. One of the sections is provided with suitable dowels 72 which mate with corresponding bores 73 in the other section, to hold the two sections in their assembled positions relative to each other. Each of the two sections 71 is formed with a flange 74 at each of its opposite ends and these flanges pair at the opposite ends of the guard hood to form top wall members corresponding to the top wall members 62 of the previously described hood member 60. The advantage of the split guard construction is that the two parts of the hood 70 may be separated for removal of the guard from the axle 50 without the necessity of dismantling the wheel 25. It will be noted too that in the split construction the elastic skirt 61 has the added function of normally holding the two sections 71 together.

The second embodiment of the invention shown in Figures 7 to 10 inclusive, is, in many respects, identical with the first described embodiment as indicated by the use of corresponding numerals to indicate corresponding parts. In this construction, the two wings 22a that extend downward from the swivel member 21 and are interconnected by a lower transverse wall 76. Mounted inside the two wings 22a and straddled by the two wings, is a forked member comprising an inner pair of wings 80 and an interconnecting upper transverse wall 81. The outer pair of wings 22a and the inner pair of wings 80 are pivotally interconnected in a suitable manner, for example, by cylindrical pivot members 82. The pivot members 82 are welded into bores 83 in the outer wings 22a and are rotatably engaged by bores 84 in the inner wings 80. The inner pair of wings 80 carry the axle 50 for the support wheel 25a, and the axle extends through arcuate slots 85 in the outer wings 22a, respectively, the two slots being concentric to the axis of the pivot members 82.

It is apparent in Figure 7 that a load imposed on the base member 20 of the castor construction and transmitted to the support wheel 25 through the axle 50 will tend to cause counterclockwise rotation of the inner wings 80 about the axis of the pivot members 82 to swing the upper transverse wall 81 towards the lower transverse wall 76. The invention contemplates the interposing of suitable shock-absorbing resilient means between the two transverse walls 76 and 81 to resist this rotation. Preferably, the yielding means is in the form of a rubber-like body 86 of neoprene or other elastomer which body is mounted in the downwardly facing pocket formed by the two inner wings 80 and the interconnecting transverse wall 81, as best shown in Figure 9.

It is further contemplated that the preferred practice of the invention will permit adjustment of the degree to which the resilient body 86 is compressed at any given relative rotary position of the inner wings 80. For this purpose, a suitable adjustment screw 90 is threaded into the lower transverse wall 76 to thrust upward against a pressure plate 91 on the underside of the resilient body 86. As shown in the drawings, the pressure plate 91 is preferably imbedded in the lower portion of the resilient body 86, and is somewhat smaller than the cross-sectional area of the opening into the pocket in which the resilient body is seated. Thus, there is sufficient clearance around the pressure plate to permit displacement flow of the material of the resilient body 86, such flow being suitably restricted to provide the desired yielding resistance to rotation of the inner wings 80 relative to the outer wings 22a. In the construction shown, the adjustment screw 90 is provided with a nut 92 and a washer 93, the nut 92 being tightened to releasably maintain the screw at desired positions of adjustment.

It is contemplated that this second embodiment of the invention will be provided with the usual guard 26a to enclose the lower portion of the support wheel 25a. The guard 26a is apertured to receive the axle 50 and is mounted on the axle 60 with the side walls of the guard outside the wings 22a.

It is apparent that the rotary position of the inner wings 80 relative to the outer wings 22a will vary with the vertical load imposed by the vehicle and that with the load carried by the vehicle unevenly distributed among the various castors, the more heavily loaded castors will tend to yield with correspoding upward movement of the castor wheels towards the corresponding base members 20. An advantage of this construction, however, is that the various screws 90 of the various castors may be adjusted to equalize the spacing of the various support wheels 25a below the corresponding base members 21. Since the guard 26a carried by the axle 50 moves relative to the outer wings 22a in accord with changes in the compression of the resilient body 86, one or both of the outer wings 22a may be provided with index means in the form of scale marks 95 to be read with reference to the upper edge of the guard. Thus, the scale marks 95 serve as a visual guide for adjustment of the various screws 90 of the various castors for equalization of the spacing of the castor wheels below the corresponding base members 20.

Figure 11 shows how a pair of special nuts 100 may be substituted for the hexagonal nuts 52 in the first embodiment of the invention to permit the castor to be steered by a suitable steering yoke 101. Each of the special nuts 100 is in the form of a cylindrical cap member that threads onto the end of the axle 50 to serve in effect as an extension of the axle, the cap member being cut away at its outer end to provide parallel surfaces 102 to receive a wrench. The steering yoke 101 has a suitable shank 103 and the two arms 104 of the yoke are formed with slots 105 for releasable engagement with the special nuts 100.

Our description in specific detail of the selected embodiments of the invention to illustrate the principles involved will suggest to those skilled in the art various changes, substitutions and other departures from our disclosure that properly lie within the spirit and scope of the appended claims.

We claim:

1. In a heavy duty castor for use with other castors to support a vehicle, the combination of: an upper base member for attachment to said vehicles; a swivel member rotatably mounted on the underside of said base member; a first pair of rigid wings extending downward from said swivel member, said wings being interconnected by a first transverse wall below said swivel member; a second pair of downwardly extending wings pivotally connected to said first pair of wings for rotation relative thereto about a transverse axis positioned on one side of the axis of said swivel member, said second pair of wings being interconnected by a second transverse wall positioned above said first transverse wall for movement downward towards the first wall in response to load-actuated rotation of said second pair of wings; a support wheel carried by said second pair of wings for rotation relative thereto about an axis on said one side of the axis of said swivel member; and resilient means in compression between said two transverse walls.

2. A castor as set forth in claim 1 in which said resilient means is an elastomer body.

3. In a castor for use with other castors to support a vehicle, the combination of: an upper base member for attachment to said vehicle; a swivel member rotatably mounted on the underside of said base member; a forked member pivotally mounted on said swivel member to rotate relative thereto about a substantially horizontal axis on one side of the axis of said swivel member; a wheel carried by said forked member with the axis of the wheel spaced from said horizontal axis on said one side of the axis of the swivel member whereby the spacing of the wheel below the vehicle varies with the rotary position of said forked member relative to the swivel member; and yielding means in compression between said forked member and the swivel member to resist the load-actuated rotation of the forked member.

4. A castor as set forth in claim 3 which includes adjustable means in engagement with said yielding means to vary the relative rotary position of said forked member under a given loading in the castor for equalizing the spacing of the wheel of the castor below the vehicle with the vertical spacing of the wheels of said other castors.

5. In a castor for use to support a vehicle body on a rail, the combination of: an upper base member for attachment to the vehicle body; a swivel member rotatably mounted on the underside of said base member; a pair of wings extending downward from said swivel member; a wheel carried by said wings, said wheel having surfaces for guiding engagement with said rail; and a guard extending downward from said wings and enclosing at least the lower portion of said wheel, said guard being dimensioned to extend below the top of said rail and being recessed to clear the rail and to serve as means to dislodge objects from the rail in the path of the wheel.

6. A castor as set forth in claim 5 in which the radial distance of the bottom of said guard from the axis of the wheel is greater than the radial dimension of the wheel between said flanges but less than the radial dimension of the flanges whereby the wheel may roll on a horizontal surface with said guard clearing the horizontal surface.

7. A castor as set forth in claim 5 in which said wheel and guard are mounted on an axle and said guard is of split construction with separable parts to permit the guard to be removed from the axle without the necessity of removing the wheel from the axle.

8. In a castor for use to support a vehicle body on a rail, the combination of: an upper base member for attachment to the vehicle body; a swivel member rotatably mounted on the underside of said base member; a pair of wings extending downward from said swivel member; a wheel carried by said wings, said wheel having surfaces for guiding engagement with said rail; and a guard extending downward from said wings, said guard having side walls enclosing the lower portion of said wheel and a top wall having an opening surrounding the wheel, said guard having upward extensions lying between said flanges of the wheel to prevent anything of substantial size from clinging to the periphery of the wheel and from passing downward into the interior of the guard.

9. In a castor for use to support a vehicle body, the combination of: an upper base member for attachment to the vehicle body; a swivel member rotatably mounted on the underside of said base member; a pair of wings extending downward from said swivel member; a wheel carried by said wings; a rigid guard member surrounding said wheel and extending downward from said wings; and a flexible skirt of rubber-like material surrounding the lower portion of said wheel, said skirt extending downward from said rigid guard, said skirt being removably mounted on said guard by elastically embracing the guard.

10. A castor as set forth in claim 9 in which said rigid guard has an upwardly directed peripheral shoulder and said skirt has a downwardly directed inner shoulder in engagement therewith.

11. In a castor for use to support a vehicle body for conveying heavy loads, the combination of: an upper base member for attachment to the vehicle body; a kingpin extending downward from said base member; a swivel member mounted on the underside of said base member for rotation relative thereto about a substantially vertical axis, said swivel member having an aperture concentric to said axis to receive said kingpin, said aperture having a conical enlargement on the underside of the swivel member; an anti-friction bearing between said base member and swivel member, said bearing having a series of rotary load transmitting elements arranged in a circle concentric to said kingpin; a series of balls around said kingpin in contact with said conical enlargement of the aperture; and means including a nut threaded onto said kingpin to exert upward pressure to wedge said balls against said conical enlargement and against the periphery of the kingpin whereby the nut may be tightened to compensate for reduction in diameter of the kingpin by wear; and a wheel rotatably carried by said swivel member.

12. A castor as set forth in claim 11 in which said base member has a circular aperture and said kingpin extends through the circular aperture in the base member, said kingpin being united with the base member solely adjacent the upper surface of the base member.

13. A castor as set forth in claim 12 in which said base member aperture is enlarged at the upper end thereof and in which said kingpin has a corresponding enlargement seating therein.

14. In a castor for use to support a vehicle body for conveying heavy loads, the combination of: an upper base member for attachment to the vehicle body; a kingpin extending downward from said base member; a swivel member adjacent the underside of said base member, said swivel member having an aperture therethrough receiving said kingpin, said swivel member having a bottom face, said aperture of the swivel member being enlarged from below to form a conical shoulder and a downwardly open annular space around the kingpin below said conical shoulder; a series of balls in said annular space cooperating with said conical shoulder and the kingpin to center the aperture relative to the kingpin, said balls being of a diameter to extend from said annular shoulder to a plane spaced below said bottom face of the swivel member;

means adjustably mounted on said kingpin to support said balls from below; a ring of resilient material interposed between said adjustment means and said bottom face to seal off said annular space; and an antifriction bearing between said base member and said swivel member including a series of rotary load-transmitting elements arranged in a circle concentric to the kingpin.

15. A castor as set forth in claim 14 in which said wheel is carried by a pair of wings extending downward from said swivel member, the radial distance of the axis of the wheel from the vertical axis of said bearing being nearly the radial dimension of the bearing.

16. A castor as set forth in claim 15 in which the diameter of said wheel is at least on the order of magnitude of the diameter of said circle.

17. In a castor for a vehicle to support heavy loads in a manufacturing plant, the combination of: a swivel member for rotatably mounting on the underside of the vehicle, said swivel member having a pair of spaced downwardly extending wings; an axle extending through said wings; a castor wheel carried by said axle; a guard mounted on said axle and surrounding said wheel; and a steering yoke releasably connected to the opposite ends of said axle for manual movement of said wheel about the axis of rotation of said swivel member.

18. A combination as set forth in claim 17 which includes nut members on the outer ends of said axle and in which said steering yoke releasably engages said nut members.

19. In a heavy duty castor for use with other castors to support a vehicle, the combination of: an upper base member for attachment to said vehicle; a swivel member rotatably mounted on the underside of said base member; a first pair of rigid wings extending downward from said swivel member, said wings being interconnected by a first transverse wall below said swivel member; a second pair of downwardly extending wings pivotally connected to said first pair of wings, said second pair of wings being interconnected by a second transverse wall positioned for movement towards the first wall in response to load-actuated rotation of said second pair of wings; a support wheel carried by said second pair of wings; resilient means in compression between said two transverse walls; and means including an adjustment screw mounted in said first transverse wall to thrust adjustably against said resilient means to vary the rotary position of said second pair of wings relative to said first pair.

20. A castor as set forth in claim 19 in which said first pair of wings have arcuate slots and in which said wheel is mounted on an axle that extends through said arcuate slots.

21. In a heavy duty castor for use with other castors to support a vehicle, the combination of: an upper base member for attachment to said vehicle; a swivel member rotatably mounted on the underside of said base member; a first pair of rigid wings extending downward from said swivel member, said wings being interconnected by a first transverse wall below said swivel member; a second pair of downwardly extending wings pivotally connected to said first pair of wings, said second pair of wings being interconnected by a second transverse wall positioned for movement towards the first wall in response to load-actuated rotation of said second pair of wings; a support wheel carried by said second pair of wings; resilient means in compression between said two tranverse walls; and a guard surrounding at least the lower portion of said wheel, said guard being suspended from the ends of said axle outside said first pair of wings.

22. A castor as set forth in claim 21 in which said guard comprises a rigid member surrounding the wheel and a skirt of rubber-like material extending downward from said rigid member.

23. A castor as set forth in claim 22 in which said skirt is removably mounted on said rigid member by elastically embracing the rigid member.

24. In a heavy duty castor for use with other castors to support a vehicle, the combination of: an upper base member for attachment to said vehicle; a swivel member rotatably mounted on the underside of said base member; a first pair of rigid wings extending downward from said swivel member, said wings being interconnected by a first transverse wall below said swivel member; a second pair of downwardly extending wings pivotally connected to said first pair of wings, said second pair of wings being interconnected by a second transverse wall positioned for movement towards the first wall in response to load-actuated rotation of said second pair of wings; a support wheel carried by said second pair of wings; resilient means in compression between said two transverse walls; and an anti-friction bearing between said base member and said swivel member, said bearing including a plurality of rotary elements arranged in a circle, the radial distance of the axis of the wheel from the vertical axis of said circle being nearly equal to the radius of the circle.

25. A castor as set forth in claim 24 in which the diameter of said wheel is at least on the order of magnitude of the diameter of said circle.

References Cited in the file of this patent

UNITED STATES PATENTS

| | | |
|---|---|---|
| 1,680,446 | Bowen | Aug. 14, 1928 |
| 1,745,992 | Herold | Feb. 4, 1930 |
| 2,526,866 | Hershey et al. | Oct. 24, 1950 |
| 2,541,514 | Herold | Feb. 13, 1951 |
| 2,544,924 | Herold | Mar. 13, 1951 |
| 2,613,389 | Cramer | Oct. 14, 1952 |